3,679,478
PROCESS FOR REMOVING CREPIDULA FROM OYSTER SHELLS
James Edward Mulhall, Southold, N.Y., assignor to Long Island Oyster Farms, Inc., New York, N.Y.
No Drawing. Continuation-in-part of application Ser. No. 77,326, Oct. 1, 1970. This application Apr. 26, 1971, Ser. No. 137,616
Int. Cl. A01k *61/00;* B08b *3/08*
U.S. Cl. 134—25 R                                         7 Claims

ABSTRACT OF THE DISCLOSURE

The process for removing Crepidula from the shells of live oysters which preferably comprises immersing the oysters in a solution of from about 2% to about 11% of ammonium chloride in sea water (on a weight/volume basis) for a period between about 10 minutes and 8 hours.

CROSS REFERENCE TO RELATED APPLICATION

This application is a continuation-in-part of U.S. application Ser. No. 77,326, now abandoned, filed on Oct. 1, 1970 by James E. Mulhall for Process for Removing Crepidula from Oyster Shells.

BACKGROUND OF THE INVENTION

Field of the invention

This application relates to methods of removing undesirable organisms from the shells of living shell fish. More specifically, this application relates to a method of removing Crepidula from the shells of oysters.

Description of the prior art

The most pertinent prior art known with regard to the process of this invention is contained in U.S. Pats. 2,922,393, 3,103,202 and 3,455,278.

The first of these patents deals with mechanical means for harvesting oysters, distributing cultch and facilitating seed separation. A fabric cultch medium is employed. Column 3 of the patent discloses that the fabric may be impregnated to repel parasites. Specific impregnating agents are mentioned at lines 41–51 of that column. However, ammonium chloride is not mentioned or suggested and the type of impregnation which is disclosed does not solve the problem of cleaning Crepidula from oysters which are raised under natural sea bottom conditions.

U.S. Pat. 3,103,202 deals with treating cultch oyster shells with certain chemicals to prevent fouling by undesirable organisms such as Crepidula. The chemicals which are disclosed as treating agents are the highly chlorinated benzenes such as tri- and tetra-chlorobenzene. There is no disclosure or suggestion in this patent of the use of ammonium chloride solution to clean Crepidula from live oysters.

U.S. Pat. 3,455,278 is directed to a method of oyster culture which employs a slab-stake arrangement for the culture. A porous stake is used which may be treated with various copper or chlorinated benzene compounds. Again, there is no disclosure or suggestion of the use of ammonium chloride.

SUMMARY OF THE INVENTION

Live oysters removed from natural breeding areas of sea water are often covered with organisms known to the oyster trade as Crepidula. These organisms are more correctly known as the gastropod *Crepidula fornicata*. This gastropod secretes a muco-protein substance from its foot which hardens in salt water and forms a seal between its foot and the shell of an oyster.

In the past these organisms have been removed from oyster shells by hand but such processes are tedious and time consuming. If the organisms are not removed from the oysters before they are marketed, for example as whole oysters in the shell or as oysters on the half shell, they tend to spoil much more quickly than the host oyster. Upon spoiling they exude a foul odor and often give rise to the highly undesirable impression that the oyster itself has spoiled. Accordingly, their removal by swift and efficient chemical means prior to marketing is highly desirable. However, such chemicals must be such as not to adversely affect the taste of the oyster or its use as food for humans.

Applicant has now devised an extremely simple, inexpensive and swift chemical means for removing Crepidula from oyster shells. This method does not adversely affect either the taste or food properties of the oysters.

The useful concentration range of the ammonium chloride, used as the chemical Crepidula removal means, has now been found to be broader than that disclosed and claimed in the parent application.

DESCRIPTION OF THE PREFERRED EMBODIMENT

In the method of this invention Crepidula-bearing live oysters are immersed in sea water (the terminology "sea water" as used herein includes equivalent artificial salt water solutions) which additionally contains from about 2.0% to about 11% ammonium chloride. These percents are based on the weight of ammonium chloride multiplied by 100, divided by the volume of the sea water to which the ammonium chloride is added. The units used are pounds/gallon or equivalent. For example:

$$\frac{50 \text{ lbs.} \times 100}{500 \text{ gal.}} = 10\%$$

The oysters are exposed to this solution by immersion in it for a period from about 10 minutes to about 8 hours in length, preferably about 30 minutes to about 2 hours.

Immersion of the oysters for longer periods has shown no adverse results from the ammonium chloride. However, in practice the immersion is normally carried out with a large number of oysters (many bushels) in about a 450 gallon tank. If immersion for periods over about 2 hours is practiced, the oysters tend to contaminate themselves with their own waste products, due to the density of oysters in the tank, and also to consume the available oxygen in the tank. Periods of exposure in excess of about 2 hours are thus not recommended unless the water temperature is below about 40° F. or unless aeration is used. Below about 40° F. the oyster does not pump and thus there is no need for great concern about it using up the available oxygen in the tank or producing contaminating waste products.

Amounts of ammonium chloride under about 2% have been found to result in poor percentages of removal of Crepidula from oyster shells. Between about 2% and about 15% ammonium chloride the taste of the sea water, and consequently of the oysters, is not noticeably affected by the addition of the ammonium chloride. However, amounts in excess of 11% have not been found to be needed.

Lower amounts of ammonium chloride, for example 4%, can be employed during the warmer months of the year, while higher amounts, such as 10–11%, yield better results during the winter months.

After immersion, it may be desirable to flush the dislodged Crepidula off the oyster shells by flushing with a salt water spray, for example from a hose.

Treatment of oysters taken from Gardiner's Bay, N.Y., by the above-described method has consistently resulted in removal of virtually all of the Crepidula from the oysters within the preferred time and concentration range. No adverse effects on the taste or food properties of the oysters were noted.

Although the use of sea water in the practice of this invention has been described above, fresh water will also function. Sea water, however, is normally cheaper and more conveniently available.

Ammonium chloride concentrations and exposure times for use of same have been set forth above. However, applicant believes that his invention lies in the broad concept of use of an aqueous ammonium chloride solution to remove Crepidula from oyster shells. Given this broad concept, the determination of effective concentrations and times for various conditions such as temperature is well within the skill of one skilled in the art. Thus the concentration and times set forth above are intended merely as a guide.

Although immersion is the preferred method of exposing the Crepidula-carrying oyster to the ammonium chloride solution, other methods of exposure, such as spraying, are also within the scope of this invention.

I claim:

1. The process of separating Crepidula from the shells of shell fish which comprises contacting the shell fish with an aqueous solution of an effective amount of ammonium chloride for a sufficient period to free the Crepidula from the shells.

2. The process of claim 1 wherein the separation process comprises the subsequent step of spraying the shells with water to wash the separated Crepidula off the shells.

3. The process of claim 1 wherein the shells are oyster shells and wherein said contact takes place by immersing the shells in the solution.

4. The process of claim 3 wherein the solution contains up to about 15% ammonium chloride on a by weight per volume basis and the aqueous portion of the solution is sea water and wherein the period of contact is up to about 8 hours.

5. The process of claim 4 wherein the period is between about 10 minutes and about 8 hours.

6. The process of claim 5 wherein the solution contains from about 2 to about 11% ammonium chloride on a weight per volume basis.

7. The process of claim 6 wherein the oyster shells contain live oysters.

References Cited
UNITED STATES PATENTS

| | | | |
|---|---|---|---|
| 2,041,727 | 5/1936 | Poytherch et al. | 99—158 UX |
| 2,922,393 | 1/1960 | Munz | 119—4 |
| 3,103,202 | 9/1963 | Loosanoff et al. | 424—353 |
| 3,418,138 | 12/1968 | Dennis et al. | 99—158 |
| 3,455,278 | 7/1969 | Hunt | 119—4 |

FOREIGN PATENTS

| | | | |
|---|---|---|---|
| 660,960 | 11/1951 | Great Britain | 99—158 |

MORRIS O. WOLK, Primary Examiner

B. S. RICHMAN, Assistant Examiner

U.S. Cl. X.R.

21—58; 99—158; 119—4; 424—166